United States Patent
Zimmer

(10) Patent No.: US 10,415,615 B2
(45) Date of Patent: Sep. 17, 2019

(54) WELD-LESS COMPACTOR

(71) Applicant: Tech Oil Products, Inc., New Iberia, LA (US)

(72) Inventor: John C. Zimmer, Lafayette, LA (US)

(73) Assignee: Tech Oil Products, Inc., New Iberia, LA (US)

( * ) Notice: Subject to any disclaimer, the term of this patent is extended or adjusted under 35 U.S.C. 154(b) by 330 days.

(21) Appl. No.: 15/335,385

(22) Filed: Oct. 26, 2016

(65) Prior Publication Data

US 2017/0113430 A1   Apr. 27, 2017

Related U.S. Application Data

(60) Provisional application No. 62/246,465, filed on Oct. 26, 2015.

(51) Int. Cl.
 *F16B 5/04* (2006.01)
 *F16B 19/05* (2006.01)
 *F16B 31/02* (2006.01)

(52) U.S. Cl.
 CPC ........... *F16B 5/04* (2013.01); *F16B 19/05* (2013.01); *F16B 31/021* (2013.01); *F16B 2200/506* (2018.08)

(58) Field of Classification Search
 CPC ......... B30B 9/3003; B30B 15/04; F16B 5/02; F16B 5/04; F16B 19/05; F16B 31/021; F16B 2200/506; Y10T 403/11; Y10T 403/645
 USPC ..................................................... 403/2, 337
 See application file for complete search history.

(56) References Cited

U.S. PATENT DOCUMENTS

| 3,967,548 A | 7/1976 | Moriconi | |
|---|---|---|---|
| 4,018,148 A | 4/1977 | Wolbrink | |
| 4,184,785 A * | 1/1980 | Marjollet | F16J 13/06 403/337 |
| 4,548,132 A | 10/1985 | Moon | |
| 4,914,340 A | 4/1990 | Fox | |
| 5,004,366 A * | 4/1991 | Simmons | E01F 9/635 403/2 |
| 5,746,121 A | 5/1998 | Zimmer | |
| 6,925,930 B1 | 8/2005 | Zimmer | |
| 2007/0248432 A1 | 10/2007 | Cassatt et al. | |
| 2017/0298970 A1 * | 10/2017 | Bourges | F16B 5/02 |

FOREIGN PATENT DOCUMENTS

WO   2015048419   4/2015

OTHER PUBLICATIONS

International Search Report and Written Opinion dated Jan. 17, 2017, from Applicant's counterpart International Patent Application No. PCT/US2016/58961.

* cited by examiner

*Primary Examiner* — Josh Skroupa
(74) *Attorney, Agent, or Firm* — Jones Walker LLP

(57) ABSTRACT

A weld-less compactor includes a side wall formed by a first panel and a second panel. Each of the first and second panels includes an L-shaped extension having an opening therethrough. The weld-less compactor also includes a fastener assembly for securing the first panel to the second panel. The fastener assembly includes a bolt and a collar. The bolt has a head and a pintail. The collar is configured to fit around the pintail of the bolt. The first panel and the second panel are secured together by engaging the openings of the first panel and the second panel with the fastener assembly.

7 Claims, 7 Drawing Sheets

WELD-LESS COMPACTOR

CROSS-REFERENCE TO RELATED APPLICATION

This application claims the benefit of and priority to U.S. Provisional Patent Application No. 62/246,465, filed on Oct. 26, 2015, which is incorporated by reference herein in its entirety.

BACKGROUND OF THE INVENTION

The present invention relates to a compactor, and more particularly to a compactor assembled without or substantially without the welding of metal parts.

In the marine environment, such as on offshore platforms or ships, compactors are used to compact refuse. Conventional compactors are constructed of carbon steel and many, if not all, of their metal-to-metal connections are formed by welding.

Applicant's U.S. Pat. No. 5,746,121 (which is incorporated herein by reference) discloses a trash compactor for use in the offshore drilling and production industry. The compactor includes a container having four sidewalls, a floor portion, and an open top, all defining a trash container space. Compaction means (e.g., a ram assembly) is positioned above the container.

Applicant's U.S. Pat. No. 6,925,930 (which is incorporated herein by reference) discloses a trash compactor and bailer combination for use in the offshore environment. The compactor/bailer includes a structure with four sidewalls, a floor portion, and an open top. The structure's floor is constructed of ¼ or ⅔ inch steel plate. The sidewalls are joined to adjacent sidewalls to reinforce corner pieces. Compaction means are provided and include a hydraulic ram.

Applicant's International Publication No. WO 2015/048419 (which is incorporated herein by reference) discloses a compactor system for use onboard marine vessels and offshore installations. The compactor has a cart with bottom and side members. The system includes a compaction unit formed of a movable upper frame with a shoulder and a lower fixed frame.

The construction of conventional compactors is both time and labor intensive, primarily as a result of the welding processes that must be undertaken in order to construct the compactor. In conventional compactors, the majority of all metal-to-metal connections are accomplished by welding of the metal parts. Accordingly, welders are employed at considerable labor costs. Moreover, the welding process is time intensive both in the welding process itself but also in the cleanup. Cleanup requires that the welding portions be punched to chip buckshot off the metal surfaces. The welded areas of the compactor must be subjected to sandblasting to a point where white metal appears in order that paint may be adhered to the surfaces. Typically, four coats of paint are applied, which results in at least four days of wait time while the paint dries.

Conventional compactors constructed by welding are susceptible to corrosion and rust formation, particularly in the marine environment. Cracks often appear in the welded areas. Cracks, which are exposed to the high salt content of the marine environment, often corrode leading to structural instability of the compactor. This may cause the compactor to operate less efficiently or cause failure due to the requirement for high force loads during the compaction process.

The need exists for an improved compactor that is more efficient to produce and which has improved corrosion resistance in the marine environment.

SUMMARY OF THE INVENTION

The present invention is a compactor that achieves exceptional performance capabilities in the marine environment with reduced susceptibility to corrosion and rust formation.

The present invention is a compactor that achieves improved efficiency in production and assembly.

The present invention is a compactor that eliminates all or substantially all welded metal-to-metal connections.

The present invention is a compactor that replaces all or substantially all of the welded metal-to-metal connections with press-fitted connections that may, but do not necessarily, include an additional metal layer to add structural support.

The present invention is a compactor that is constructed entirely of or substantially of stainless steel, which is corrosion resistant in the marine environment.

The present invention is a compactor that may be shipped disassembled and reassembled at the operation site or other location.

DETAILED DESCRIPTION OF THE INVENTION

Figure 1:
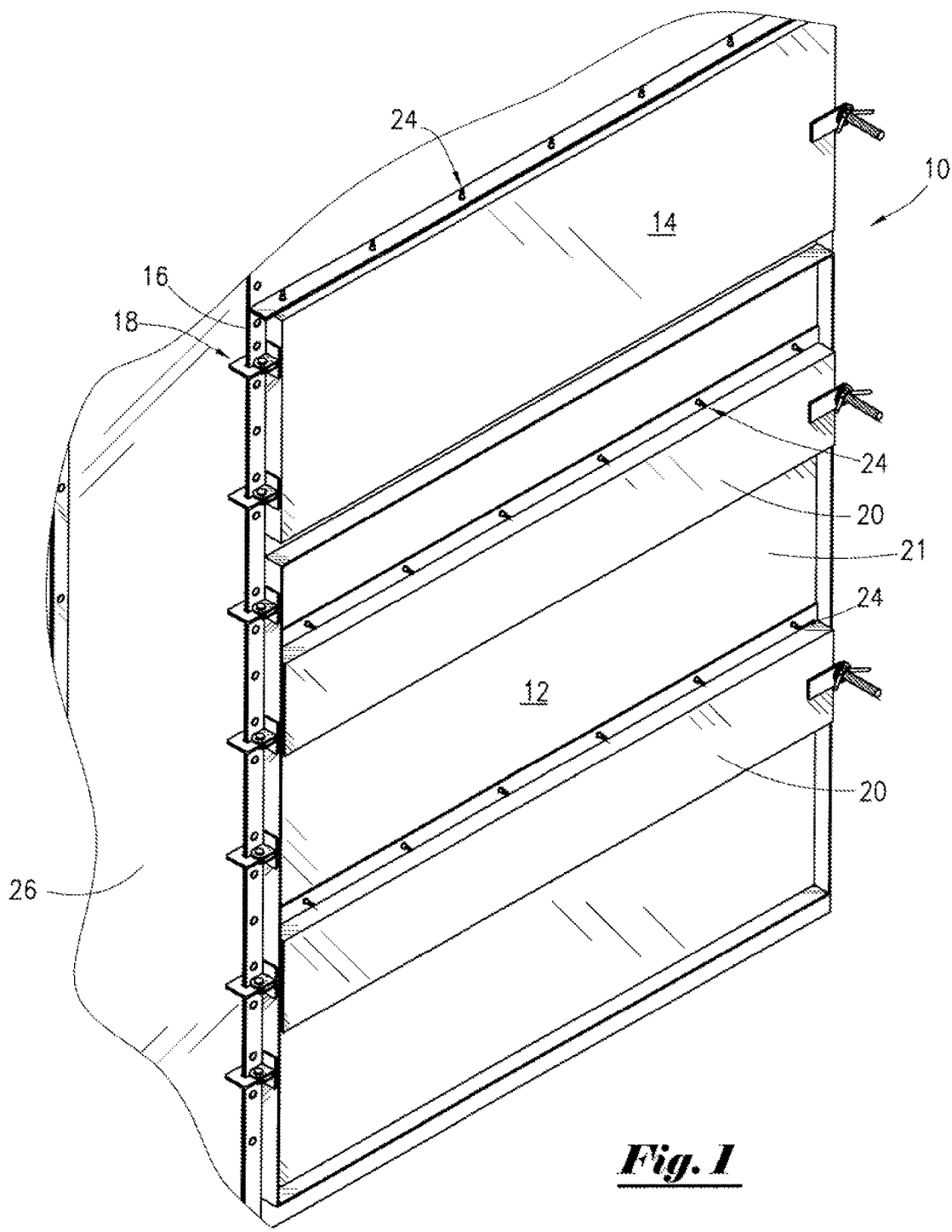
FIG. 1 is a perspective view of the compactor.

FIG. 1 shows compactor 10. Compactor 10 includes lower access door 12 and upper access door 14, both of which are hingedly connected to the front frame member 16 by one or more hinge assemblies 18. Lower access door 12 contains panels 20 which are affixed to lower access door panel 21 by one or more fastener assemblies 24.

Figure 2:
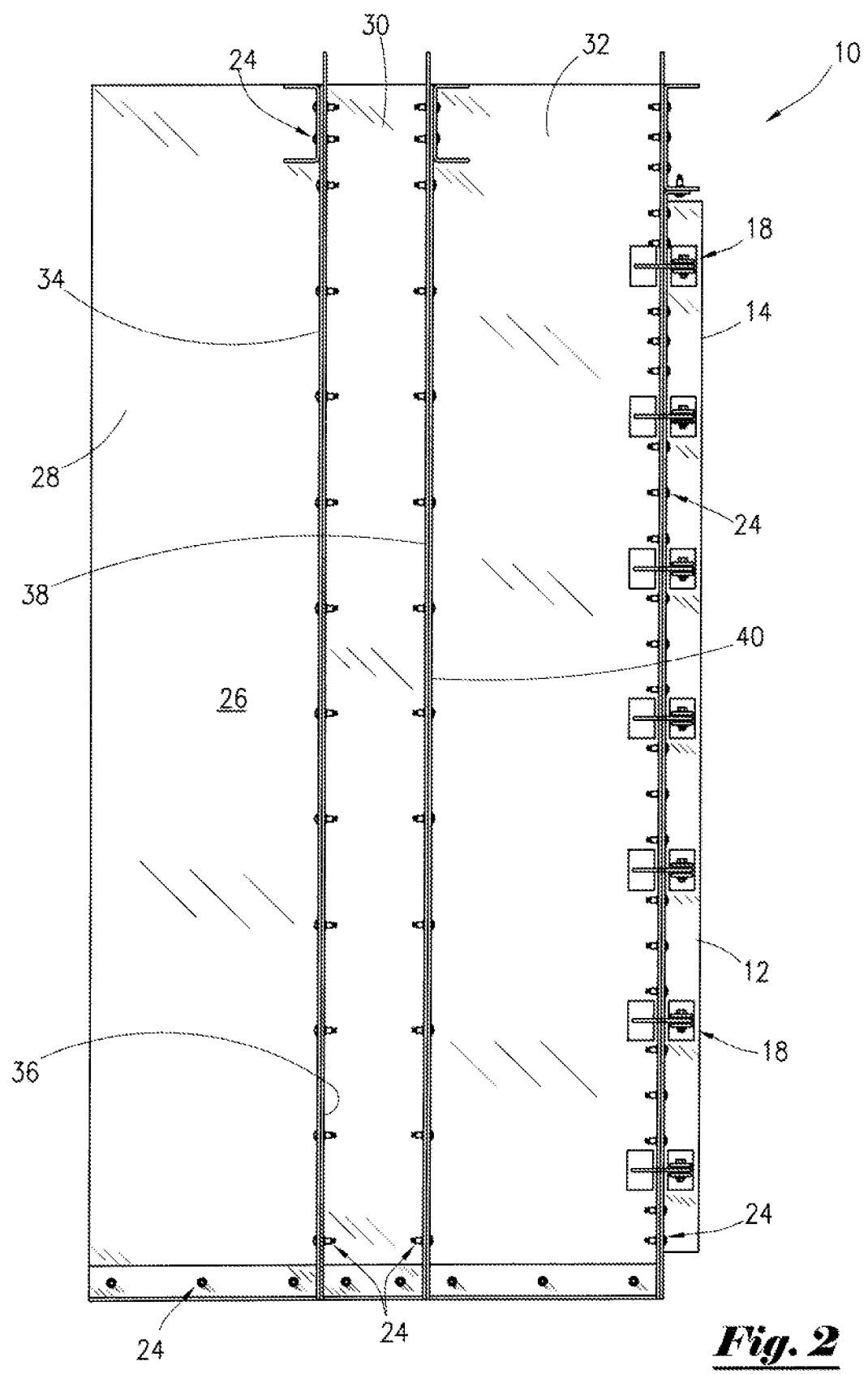
FIG. 2 is a side view of the compactor.

FIG. 2 shows side panel 26 of compactor 10. Side panel 26 contains separate side panels 28, 30, 32. Separate side panels 28, 30, 32 are interconnected by fastener assemblies 24. For example, separate side panel 28 containing L-shaped extension 34 is structurally connected via fastener assemblies 24 to L-shaped extension 36 of separate side panel 30. L-shaped extension 38 of separate side panel 30 is structurally connected via fastener assemblies 24 to L-shaped extension 40 of separate side panel 32.

Figure 3:
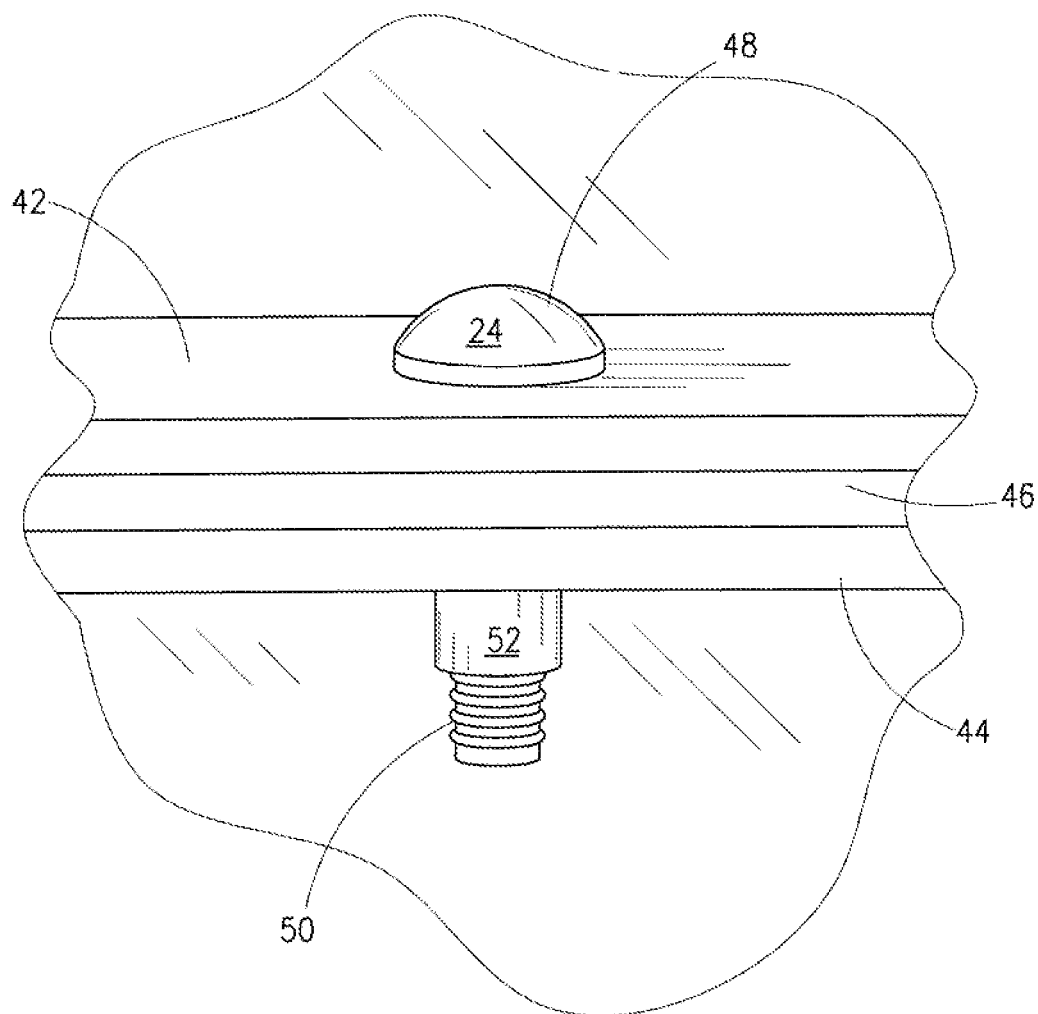
FIG. 3 is a perspective top view of the metal-to-metal connection employed in the compactor.

FIG. 3 shows fastener assembly 24 fixedly connecting panel 42 to panel 44. Intermediate support panel 46 has been positioned between the connection of panel 42 and panel 44.

Intermediate support panel 46 provides additional structural support and increases the strength of the joint of or connection between panels 42, 44.

Figure 4:
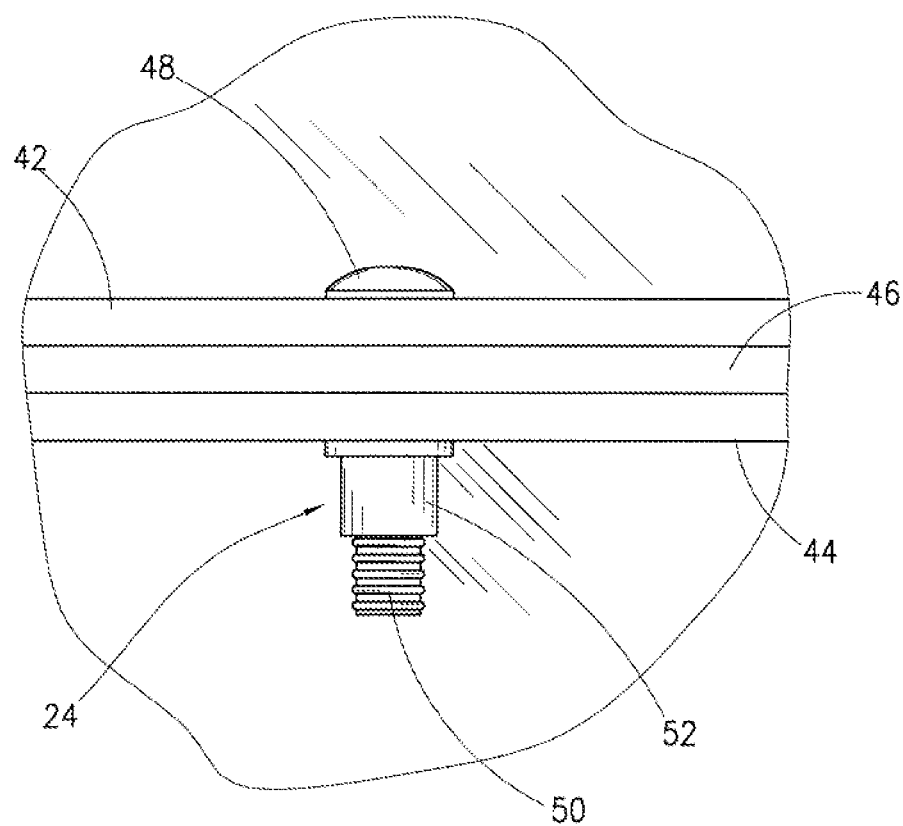
FIG. 4 is a side view of the metal-to-metal connection shown in FIG. 3.

FIG. 4 shows another view of the metal-to-metal connection between panels 42, 44 using fastener assembly 24. Intermediate support panel 46 is sandwiched between panels 42, 44. Fastener assembly 24 includes head 48 connected to pintail 50. Collar 52 has been press fitted onto pintail 50 thereby fixedly retaining and connecting panel 42, intermediate support panel 46, and panel 44.

Figure 5:
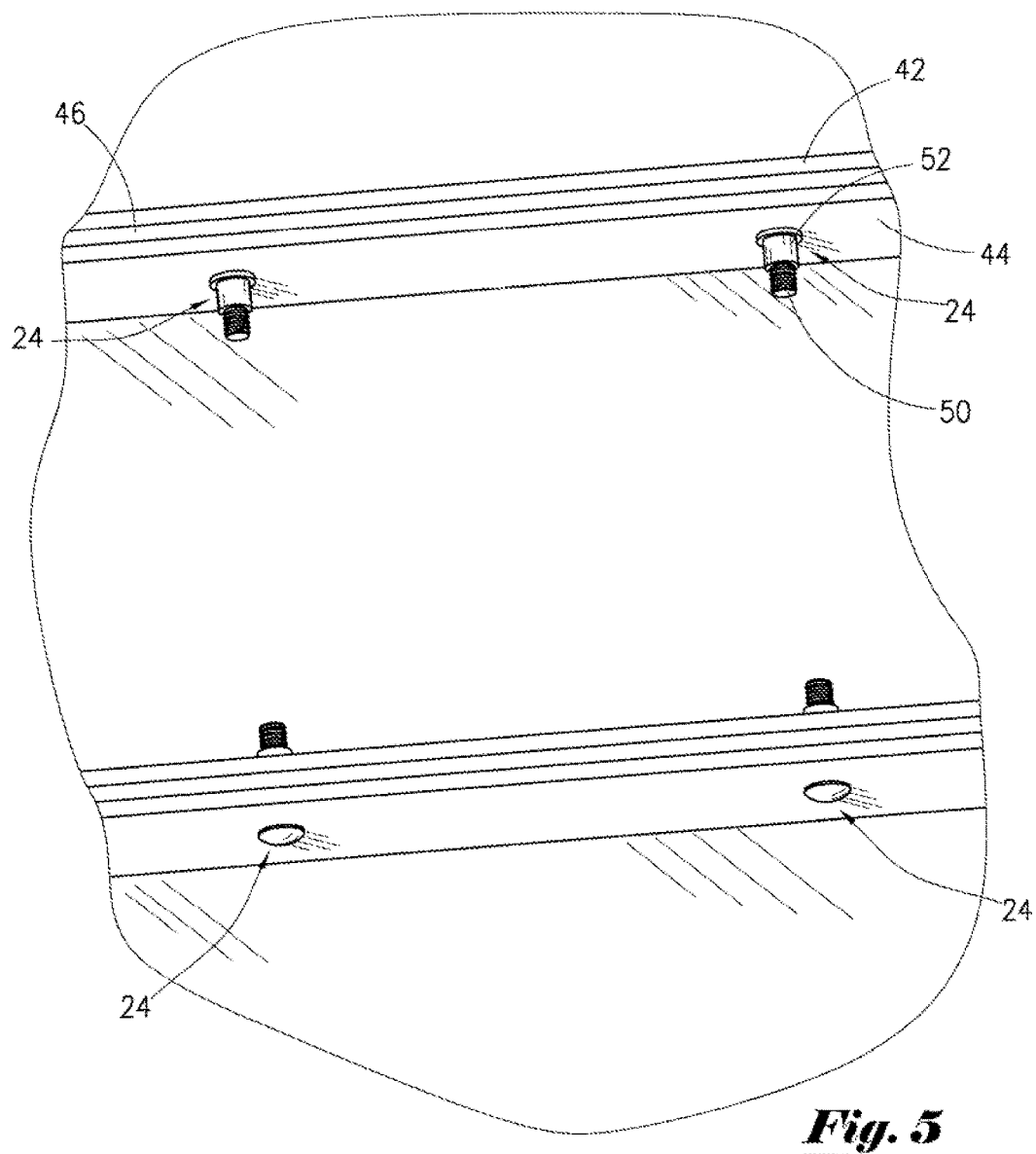
FIG. 5 is a bottom perspective side view of the metal-to-metal connection employed in the compactor.

FIG. 5 shows the underside of fastener assembly 24 as it provides the connection between panels 42, 46, 44. Collar 52 is shown press fitted to pintail 50.

Figure 6:
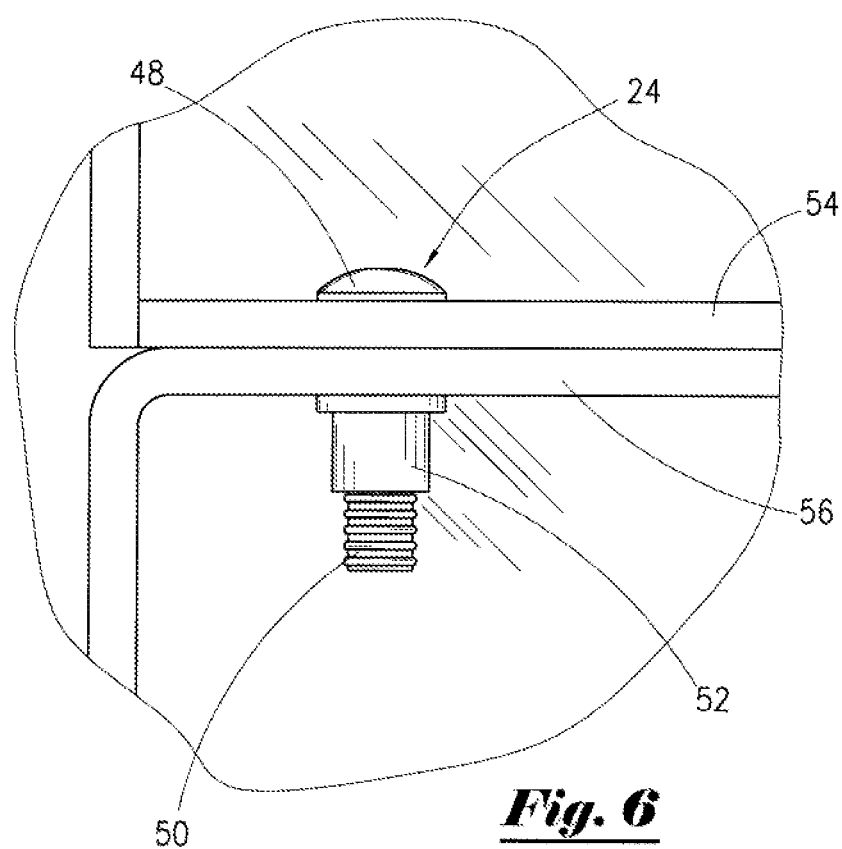
FIG. 6 is a side view of another embodiment of the metal-to-metal connection employed in the compactor.

FIG. 6 shows a direct metal-to-metal fixation between panel 54 and panel 56 using fastener assembly 24.

Figure 7:
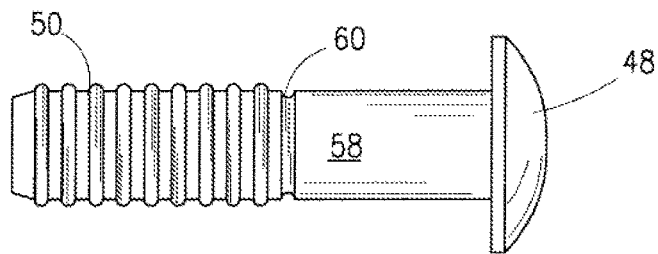
FIG. 7 is a side view of the bolt of the fastener assembly.
Figure 8:
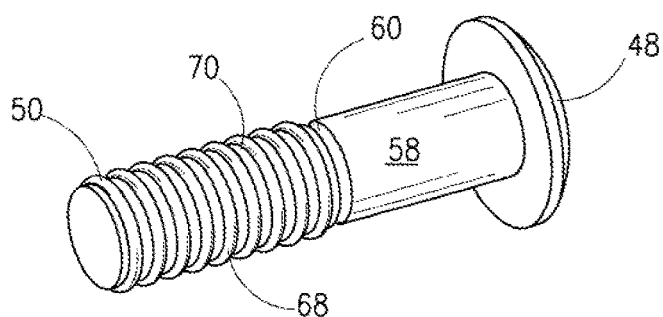
FIG. 8 is a perspective view of the bolt of the fastener assembly.

FIGS. 7 and 8 show bolt portion 58 of fastener assembly 24. Bolt portion 58 encompasses head 48 and pintail 50. Break neck groove 60 may be included in bolt portion 58 to facilitate the shearing of fastener assembly 24 when it is desired to disconnect fastener assembly 24 from connection to one or more metal panels.

Figure 9:
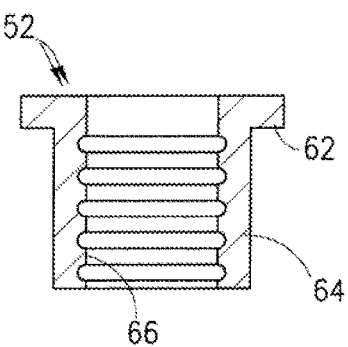
FIG. 9 is a cross-sectional view of the collar of the fastener assembly taken along line 9-9 of FIG. 10.
Figure 10:
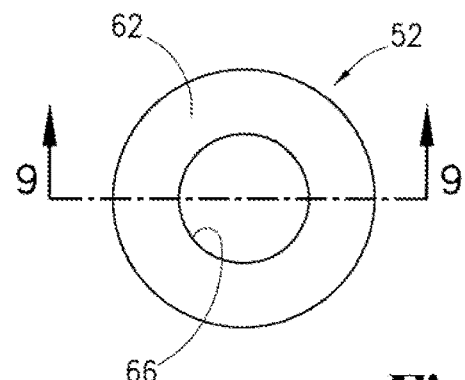
FIG. 10 is a top view of the collar of the fastener assembly.

FIGS. 9 and 10 show collar 52 of faster assembly 24. Collar 52 includes flanged section 62 and collar section 64. Collar section 64 contains an inner bore wall 66. Before press fitting collar 52 onto bolt 58, inner bore wall 66 is smooth. Press fitting of collar 52 onto bolt 58 causes inner bore wall 66 to be pressed into the threaded section 68 of bolt 58 and to deform in the recesses 70 in the threaded section 68 thereby forming the indentations shown in FIG. 9.

Fastener assembly 24 may be any fastener performing a press fitting or riveting function. For example, fastener assembly 24 may take the form of Huck bolts commercially available from Alcoa. Fastener assemblies 24 are precision engineered two-piece fasteners that once installed, never come loose regardless of the vibration the assembly is subjected to.

In order to provide the metal-to-metal fixation using fastener assembly 24, bolt 58 is placed through cooperating recesses in the one or more metal panels to be connected together. Collar 52 is placed on bolt 58. A press fitting tool is placed over pintail 50 and activated causing head 48 to be pulled against the metal surface and the tool's anvil pushes collar 52 against the joint. An initial clamp is generated. The tool swages collar 52 thereby increasing the clamping force. A portion of pintail 50 may break. Installation is complete. The squeezing action caused by the tool reduces the diameter of collar 52, increasing its length. This in turn stretches bolt 58, generating a clamp force over the joint. A quick visual inspection is all that is required for a quality-assured joint.

Fastener assembly 24 may be made of steel, aluminum, or stainless steel. Fastener assemblies 24 made of stainless steel are used in connection with compactor 10. The style of head 48 may vary such as round, 90° flush, flanged, and 98T head styles. The size of fastener assembly 24 may vary and include ¼ inch, 5/16 inch, ⅜ inch, ½ inch, ⅝ inch, ¾ inch, ⅞ inch, 1 inch, 12 mm, 14 mm, 16mm, and 20 mm.

Compactor 10 is preferably composed of stainless steel in order to provide the optimal corrosion protection. Stainless steel panels comprising compactor 10 may be ⅜ stainless steel.

Compactor 10 replaces all or substantially all welded metal-to-metal surface connections with metal-to-metal surface connections secured by fastener assemblies 24. Accordingly, compactor 10 may be manufactured more efficiently and with less expense due primarily to the elimination of high labor costs associated with the welding process. Because compactor 10 costs less to manufacture in comparison to conventional compactors that are welded, compactor 10 may be made with stainless steel and still be competitively priced. Compactor 10 is less susceptible to corrosion in the marine environment and is made structurally stronger due to the ability to provide intermediate metal layer or layers in between cooperating joint of the metal surfaces affixed by fastener assemblies 24. The ability to add supporting metal layers to provide structural strength is achieved without substantial increase in wall thickness. Wall thickness may be anywhere from ½ inch to less than ⅛ inch. Compactor 10 also has the benefit of being capable of being shipped disassembled and then later assembled at the operations site or other location.

Compactor 10 made of stainless steel is also advantaged in that its weight is about one-half of that of a comparably-sized conventional compactor made of carbon steel. Reduced weight is achieved because thinner gauge sheets of stainless steel may be used in those areas of compactor 10 that do not take the direct load forces of the compaction.

While the invention has been described in connection with compactor 10, it is to be understood that the weld-less manufacturing processes described herein are equally applicable to other equipment and tools requiring metal-to-metal surface connections.

What is claimed is:

1. A weld-less compactor comprising:
an external side wall formed by a first panel and a second panel, wherein each of the first and second panels includes an L-shaped extension having an opening therethrough;
a fastener assembly including a bolt and a collar, wherein the bolt has a head and a pintail, and wherein the collar is configured to fit around the pintail of the bolt;
wherein the first panel and the second panel are secured together by engaging the openings of the first panel and the second panel with the fastener assembly and press fitting the collar onto the pintail of the bolt;
wherein the weld-less compactor is configured for operation in a marine environment substantially without any welded metal-to-metal surface connections.

2. The weld-less compactor of claim 1, wherein the pintail of the bolt engages the first panel, wherein the pintail is disposed through the openings of the first panel and the second panel, and wherein the collar is disposed around the pintail and engages the second panel.

3. The weld-less compactor of claim 2, wherein the pintail of the bolt includes a break neck groove configured to be sheared to disconnect the first panel and the second panel.

4. The weld-less compactor of claim 1, wherein the compactor is constructed substantially entirely of stainless steel.

5. The weld-less compactor of claim 1, wherein the collar includes a flanged section and a collar section, the collar section contains an inner bore wall, the inner bore wall being smooth before the collar is press fitted onto the pintail of the bolt.

6. The weld-less compactor of claim 5, wherein the pintail of the bolt contains a threaded section, the threaded section causing indentations in the inner bore wall of the collar section of the collar when the collar is press fitted onto the pintail of the bolt.

7. The weld-less compactor of claim 1, wherein the external sidewall has a thickness in the range of ½ inch to ⅛ inch.

\* \* \* \* \*